United States Patent
Sahu et al.

(10) Patent No.: US 11,947,534 B2
(45) Date of Patent: Apr. 2, 2024

(54) CONNECTION POOLS FOR PARALLEL PROCESSING APPLICATIONS ACCESSING DISTRIBUTED DATABASES

(71) Applicant: Oracle International Corporation, Redwood Shores, CA (US)

(72) Inventors: Sumit Sahu, Bangalore (IN); Lakshminarayanan Chidambaran, Bangalore (IN); Krishna Itikarlapalli, Bangalore (IN); Srinath Krishnaswamy, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 314 days.

(21) Appl. No.: 16/731,100

(22) Filed: Dec. 31, 2019

(65) Prior Publication Data

US 2021/0200765 A1 Jul. 1, 2021

(51) Int. Cl.
*G06F 16/2453* (2019.01)
*G06F 9/48* (2006.01)
*G06F 9/52* (2006.01)
*G06F 16/27* (2019.01)

(52) U.S. Cl.
CPC ........ *G06F 16/24532* (2019.01); *G06F 9/485* (2013.01); *G06F 9/52* (2013.01); *G06F 16/27* (2019.01)

(58) Field of Classification Search
CPC ...... G06F 16/24532; G06F 9/485; G06F 9/52; G06F 16/27; G06F 9/5027; G06F 2209/5018; G06F 9/5077
See application file for complete search history.

(56) References Cited

U.S. PATENT DOCUMENTS

| | | | |
|---|---|---|---|
| 2004/0057388 A1* | 3/2004 | Kolbe | H04W 24/00 370/252 |
| 2004/0143562 A1* | 7/2004 | Chen | G06F 16/284 |
| 2009/0059785 A1* | 3/2009 | Jogalekar | H04L 47/70 370/230 |
| 2014/0173613 A1* | 6/2014 | Dunn | G06F 9/5016 718/104 |

(Continued)

OTHER PUBLICATIONS

Class Sequel:ConnectionPool, https://sequel.jeremyevans.net/doc/classes/Sequel/ConnectionPool.html, downloaded circa Oct. 18, 2019, 03 pages.

(Continued)

*Primary Examiner* — Amresh Singh
*Assistant Examiner* — Fernando M Mari Valcarcel
(74) *Attorney, Agent, or Firm* — IPHORIZONS PLLC; Narendra Reddy Thappeta

(57) ABSTRACT

A server system provided according to an aspect of the present disclosure provides a shared connection pool to parallel execution entities accessing database instances of a distributed database when processing requests. A shared connection pool implies that each pool connection of the connection pool may be used for serving different execution entities requiring access to different database instances. In an embodiment, the database instances correspond to shards together implementing a distributed database, and the parallel execution entities correspond to threads.

20 Claims, 15 Drawing Sheets

(56) References Cited

U.S. PATENT DOCUMENTS

2015/0347192 A1* 12/2015 Blaine .................. G06F 9/4881
                                                        718/103
2016/0335132 A1* 11/2016 Ash ........................ G06F 9/505
2017/0109215 A1*  4/2017 Alexeev ................ G06F 9/5055
2019/0188314 A1   6/2019 Mirizzi ................. G06F 16/285
2019/0327339 A1* 10/2019 Stanton ............... G06Q 20/027

OTHER PUBLICATIONS

ShardConnPoolStats, Mongo DB Manual, https://docs.mongodb.com/manual/reference/command/shardConnPoo, downloaded circa Oct. 18, 2019, 01 page.

* cited by examiner

| | Customer Id | Customer First Name | Customer Last Name | Customer Email | Region |
|---|---|---|---|---|---|
| 410 → | | | | | |
| 411 → | SK1 | FirstName1 | LastName1 | email1@company.com | Asia |
| 412 → | SK2 | FirstName2 | LastName2 | email2@company.com | Asia |
| 413 → | SK3 | FirstName3 | LastName3 | email3@company.com | Europe |
| 414 → | SK4 | FirstName4 | LastName4 | email4@company.com | US |
| 415 → | SK5 | FirstName5 | LastName5 | email5@company.com | Europe |
| 416 → | SK6 | FirstName6 | LastName6 | email6@company.com | US |
| 417 → | SK7 | FirstName7 | LastName7 | email7@company.com | US |
| 418 → | SK8 | FirstName8 | LastName8 | email8@company.com | Europe |
| 419 → | SK9 | FirstName9 | LastName9 | email9@company.com | Asia |
| 420 → | SK10 | FirstName10 | LastName10 | email10@company.com | US |
| 421 → | SK11 | FirstName11 | LastName11 | email11@company.com | Asia |
| 422 → | SK12 | FirstName12 | LastName12 | email12@company.com | Europe |
| 423 → | SK13 | FirstName13 | LastName13 | email13@company.com | Europe |
| 424 → | SK14 | FirstName14 | LastName14 | email14@company.com | Europe |
| 425 → | SK15 | FirstName15 | LastName15 | email15@company.com | Asia |

*FIG. 4A*

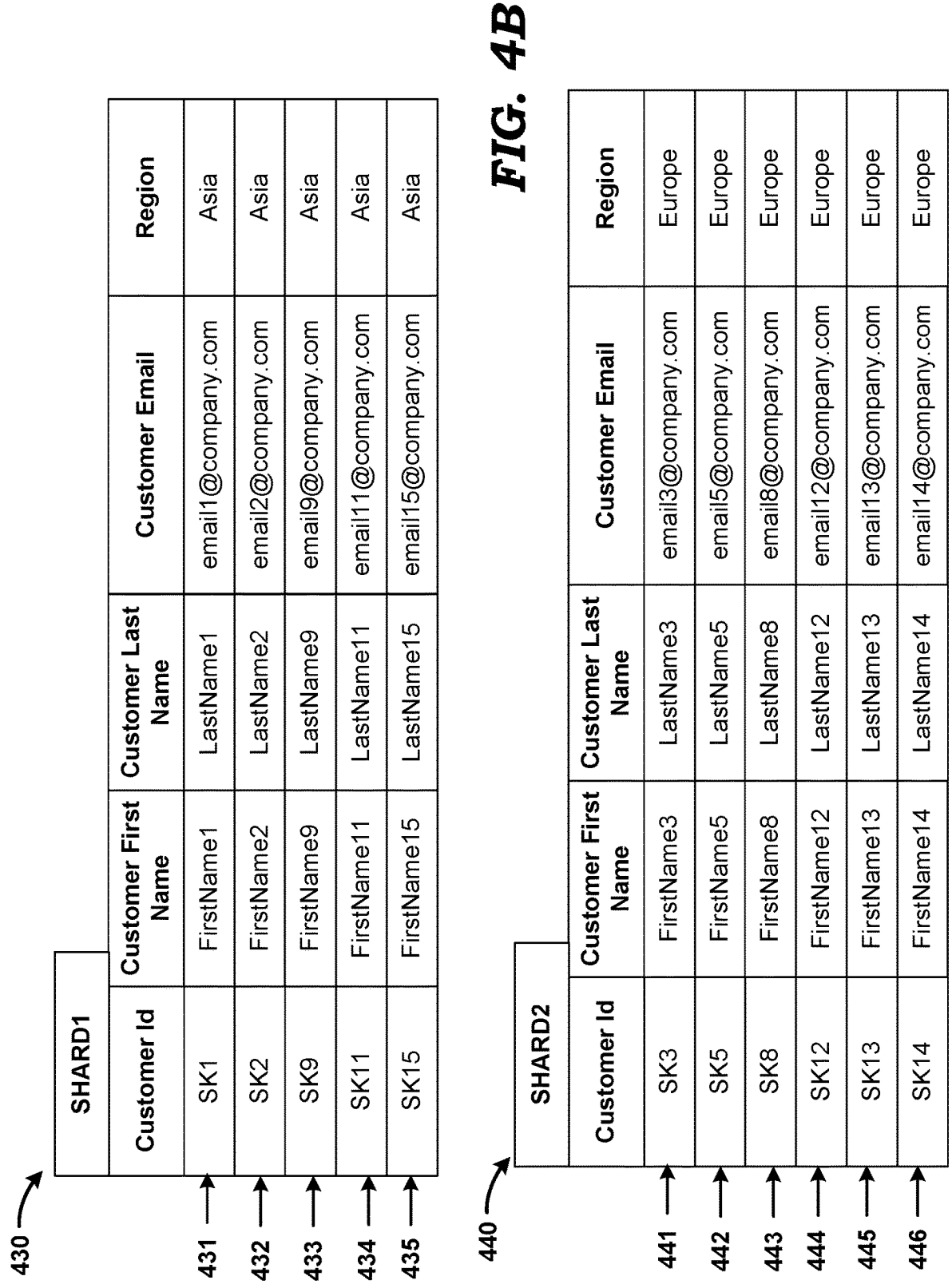

FIG. 5A

| Shard Key | Shard Identifier |
|---|---|
| SK1 | Shard1 |
| SK2 | Shard1 |
| SK3 | Shard2 |
| SK4 | Shard3 |
| SK5 | Shard2 |
| SK6 | Shard3 |
| SK7 | Shard3 |
| SK8 | Shard2 |
| SK9 | Shard1 |
| SK10 | Shard3 |
| SK11 | Shard1 |
| SK12 | Shard2 |
| SK13 | Shard2 |
| SK14 | Shard2 |
| SK15 | Shard1 |

FIG. 5B

| Shard Identifier | Database Servers |
|---|---|
| Shard1 | DBServer1, DBServer3 |
| Shard2 | DBServer2 |
| Shard3 | DBServer3, DBServer2 |

FIG. 5C

| Database Server | IP Address | Protocol | Database Port Number |
|---|---|---|---|
| DBServer1 | 1.2.3.4 | TCP | 1234 |
| DBServer2 | 5.6.7.8 | TCP | 1234 |
| DBServer3 | 9.10.11.12 | TCP | 1234 |

| Connection Identifier | Shard Identifier | Database Server | Thread Id | Connection Status | Last Used |
|---|---|---|---|---|---|
| 1 | Shard1 | DBServer1 | Thread3 | Busy | 2019-10-23 5:05:00 |
| 2 | Shard2 | DBServer2 | Thread10 | Busy | 2019-10-23 5:10:00 |
| 3 | Shard2 | DBServer2 | Thread7 | Busy | 2019-10-23 5:17:00 |
| 4 | Shard1 | DBServer1 | Thread1 | Busy | 2019-10-23 5:20:00 |
| 5 | Shard3 | DBServer3 | Thread2 | Busy | 2019-10-23 5:27:20 |
| 6 | Shard1 | DBServer3 | Thread9 | Busy | 2019-10-23 5:32:00 |
| 7 | | | | Unallocated | |
| 8 | | | | Unallocated | |
| 9 | | | | Unallocated | |
| 10 | | | | Unallocated | |

*FIG. 6A*

| Connection Identifier | Shard Identifier | Database Server | Thread Id | Connection Status | Last Used |
|---|---|---|---|---|---|
| 1 | Shard1 | DBServer1 | Thread8 | Busy | 2019-10-23 8:45:00 |
| 2 | Shard2 | DBServer2 | Thread4 | Busy | 2019-10-23 8:10:00 |
| 3 | Shard3 | DBServer2 | | Available | 2019-10-23 7:15:00 |
| 4 | Shard1 | DBServer3 | | Available | 2019-10-23 8:17:00 |
| 5 | Shard1 | DBServer1 | Thread15 | Busy | 2019-10-23 8:32:00 |
| 6 | Shard3 | DBServer3 | | Available | 2019-10-23 6:40:00 |
| 7 | Shard3 | DBServer3 | Thread16 | Busy | 2019-10-23 8:34:00 |
| 8 | Shard3 | DBServer3 | | Available | 2019-10-23 7:17:20 |
| 9 | Shard2 | DBServer2 | Thread5 | Busy | 2019-10-23 8:20:00 |
| 10 | Shard2 | DBServer2 | Thread11 | Busy | 2019-10-23 8:27:00 |

| Connection Identifier | Shard Identifier | Database Server | Thread Id | Connection Status | Last Used |
|---|---|---|---|---|---|
| 1 | Shard1 | DBServer1 | Thread8 | Busy | 2019-10-23 8:45:00 |
| 2 | Shard2 | DBServer2 | Thread4 | Busy | 2019-10-23 8:10:00 |
| 3 | Shard3 | DBServer2 | | Available | 2019-10-23 7:15:00 |
| 4 | Shard1 | DBServer3 | Thread17 | Busy | 2019-10-23 8:17:00 |
| 5 | Shard1 | DBServer1 | Thread15 | Busy | 2019-10-23 8:32:00 |
| 6 | Shard2 | DBServer2 | Thread19 | Busy | 2019-10-23 8:48:00 |
| 7 | Shard3 | DBServer3 | Thread16 | Busy | 2019-10-23 8:34:00 |
| 8 | Shard3 | DBServer3 | | Available | 2019-10-23 7:17:20 |
| 9 | Shard2 | DBServer2 | Thread5 | Busy | 2019-10-23 8:20:00 |
| 10 | Shard2 | DBServer2 | Thread11 | Busy | 2019-10-23 8:27:00 |

*FIG. 6C*

| Connection Identifier | Shard Identifier | Database Server | Thread Id | Connection Status | Last Used |
|---|---|---|---|---|---|
| 1 | Shard2 | DBServer2 | Thread21 | Busy | 2019-10-23 9:11:20 |
| 2 | Shard1 | DBServer3 | Thread28 | Busy | 2019-10-23 9:13:20 |
| 3 | Shard3 | DBServer3 | Thread22 | Busy | 2019-10-23 9:05:10 |
| 4 | Shard2 | DBServer2 | Thread20 | Busy | 2019-10-23 9:12:00 |
| 5 | Shard1 | DBServer1 | Thread29 | Busy | 2019-10-23 9:09:00 |
| 6 | Shard2 | DBServer2 | Thread27 | Busy | 2019-10-23 9:20:00 |
| 7 | Shard3 | DBServer3 | Thread23 | Busy | 2019-10-23 9:15:00 |
| 8 | Shard1 | DBServer1 | Thread24 | Busy | 2019-10-23 9:14:50 |
| 9 | Shard1 | DBServer1 | Thread26 | Busy | 2019-10-23 9:11:00 |
| 10 | Shard3 | DBServer3 | Thread25 | Busy | 2019-10-23 9:02:00 |

*FIG. 6D*

| Connection Identifier | Shard Identifier | Database Server | Thread Id | Connection Status | Last Used |
|---|---|---|---|---|---|
| 1 | Shard2 | DBServer2 | Thread21 | Busy | 2019-10-23 9:11:20 |
| 2 | Shard1 | DBServer3 | | Available | 2019-10-23 9:16:50 |
| 3 | Shard3 | DBServer3 | Thread22 | Busy | 2019-10-23 9:05:10 |
| 4 | Shard2 | DBServer2 | Thread32 | Busy | 2019-10-23 9:25:00 |
| 5 | Shard1 | DBServer1 | Thread29 | Busy | 2019-10-23 9:09:00 |
| 6 | Shard2 | DBServer2 | Thread27 | Busy | 2019-10-23 9:20:00 |
| 7 | Shard3 | DBServer3 | Thread23 | Busy | 2019-10-23 9:15:00 |
| 8 | Shard1 | DBServer1 | Thread24 | Busy | 2019-10-23 9:14:50 |
| 9 | Shard1 | DBServer1 | Thread26 | Busy | 2019-10-23 9:11:00 |
| 10 | Shard3 | DBServer3 | Thread25 | Busy | 2019-10-23 9:02:00 |

FIG. 6E

CONNECTION POOLS FOR PARALLEL PROCESSING APPLICATIONS ACCESSING DISTRIBUTED DATABASES

BACKGROUND OF THE DISCLOSURE

Technical Field

The present disclosure relates to distributed database environments and more specifically to connection pools for parallel processing applications accessing distributed databases.

Related Art

A database refers to a system which permits storage and retrieval of data using structured queries. The data can be organized using relational, hierarchical, network, etc., type models as is well known in the relevant arts. The description is provided in the context of relational databases in which data is organized in the form of tables and queries are according to Structured Query Language (SQL) well known in the relevant arts.

Database servers are often designed to store portions of the data of interest, with the database servers together providing the function of a single (distributed) database system for the entire data of interest. In the case of relational database technology, tables may be partitioned horizontally (i.e., by sets of rows), with different sets of rows of a table being stored in different database servers. Each set of such rows is referred to as a shard.

Applications are often deployed for processing user requests, with processing of each request often requiring access to the distributed database. Applications often employ parallel processing techniques to process such requests, typically for enhanced throughput performance. In general, execution entities such as threads or processes are employed for parallel processing of requests based on concurrently executing processors and/or time sharing of high performance processors, as is well known in the relevant arts.

There is a general need to provide end-to-end connections between execution entities and the distributed databases on which the database queries and responses are transmitted. In general, an established connection would imply that the corresponding connection is setup with any requisite authentication, etc., so that queries can thereafter be sent and responses received on the setup end-to-end connections.

Connection pools are often specified for providing such connections. Typically, connection pools are configured in a server executing applications, and the execution entities use the connections of the pool to transmit queries and receive responses. Aspects of the present disclosure are directed to connection pools for such parallel processing applications accessing distributed databases.

BRIEF DESCRIPTION OF THE DRAWINGS

Example embodiments of the present disclosure will be described with reference to the accompanying drawings briefly described below.

FIG. 4A depicts sample data in a distributed database.

FIG. 5A depicts sample partition map for the shards of a distributed database.

FIG. 5B depicts sample topology map indicating the specific shards served by each of the database servers.

FIG. 5C depicts sample connection configuration data for database servers.

FIGS. 6A-6E depict example states of allocation table at different time instances in chronological order.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Terminology

Figure 1:
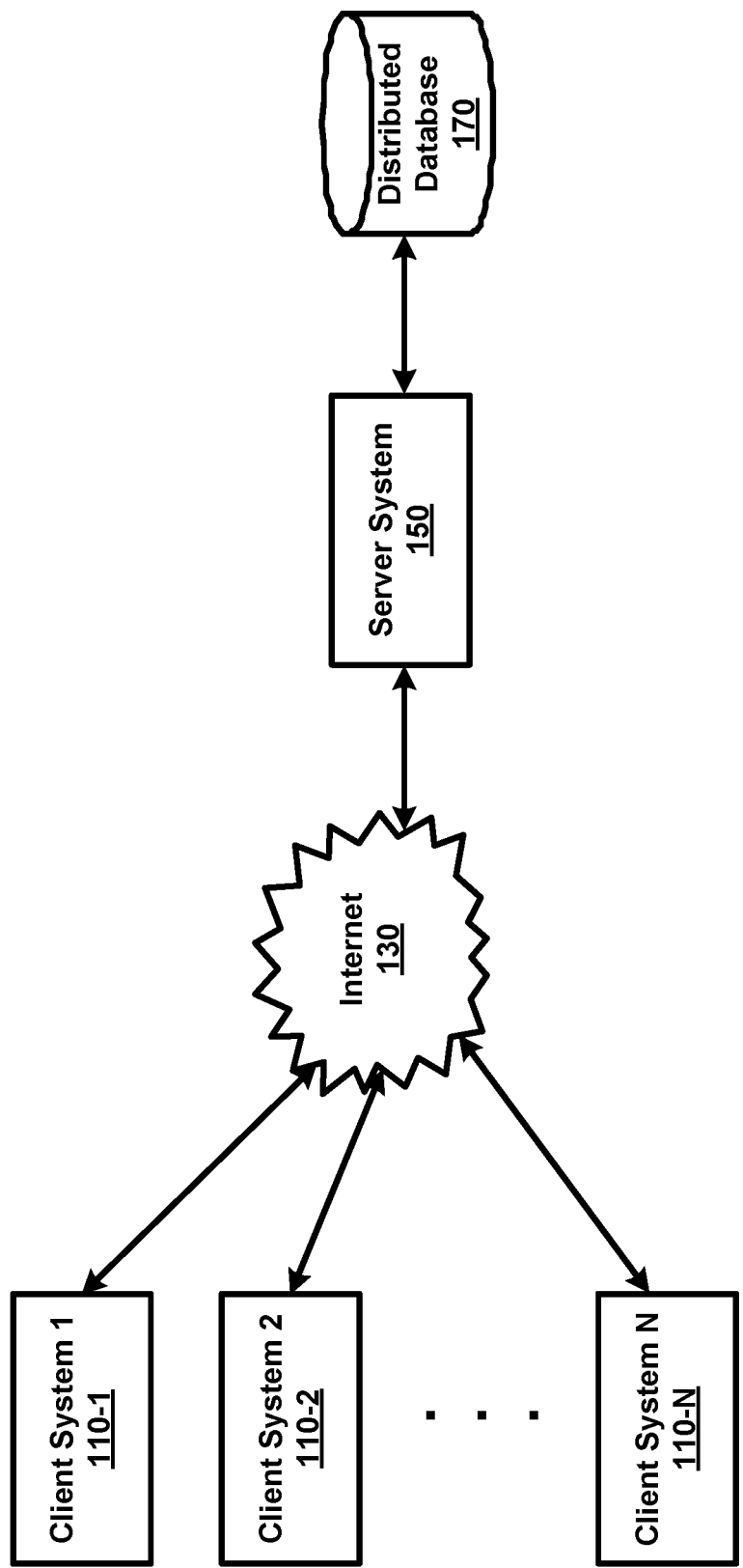
FIG. 1 is a block diagram illustrating an example environment (computing system) in which several aspects of the present disclosure can be implemented.

Pool Connections: Virtual connections of a connection pool.

Physical Connection: A pool connection established to a specific database instance/shard/database server.

End-to-end Connection: Connection between an execution entity/thread and a specific database instance/shard/database server. The end-to-end connection is based partly on a physical connection and a further virtual connection extending the physical connection to the execution entity/thread.

2. Overview

A server system provided according to an aspect of the present disclosure provides a shared connection pool to parallel execution entities accessing database instances of a distributed database when processing requests. A shared connection pool implies that each pool connection of the connection pool may be used for serving different execution entities requiring access to different database instances. In an embodiment, the database instances correspond to shards together implementing a distributed database, and the parallel execution entities correspond to threads.

According to another aspect, each thread accesses a corresponding shard on an end-to-end connection established with a respective database server storing the corresponding shard. The end-to-end connection is established to include a physical connection and a virtual connection. The physical connection is a pool connection of the shared connection pool. The virtual connection extends the physical connection to different threads in different durations to provide the end-to-end connections to different threads in corresponding durations based on the physical connection.

According to another aspect, the shared connection pool is configured to include only a maximum number of pool connections, wherein all of the threads operate to connect with the shards (used synonymously with the database servers hosting/storing the shards) using only such maximum number of pool connections.

Thus, in one scenario, a first pool connection is used as a first physical connection by a first thread to access a first shard in a first duration and by a second thread to access the first shard in a second duration. In another scenario, the first physical connection is terminated after the second duration before being opened as a second physical connection to a second shard, and a third thread thereafter uses the second physical connection to access the second shard.

In another scenario, the third thread requires a second end-to-end connection to the second shard starting from a first time instance in the second duration, when all of the pool connections are busy at the first time instance. Accordingly, execution of the third thread is suspended and placed in a queue. The thread is woken up when a thread releases an end-to-end connection to the same shard, or when a physical connection to another shard becomes idle.

According to another aspect, a pool manager is provided to establish end-to-end connections based on the pool connections for each thread upon request. In an embodiment, the pool manager maintains an allocation table indicating a status of each pool connection. The status indicates whether or not a corresponding physical connection is established on the pool connection, and if a physical connection is established on the pool connection, the shard to which the physical connection is established and whether the physical connection is currently available or busy. If the physical connection is indicated to be busy, the allocation table indicates a specific thread for which a corresponding end-to-end connection is currently provided based on the physical connection.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

3. Example Environment

FIG. 1 is a block diagram illustrating an example environment (computing system) in which several aspects of the present disclosure can be implemented. The block diagram is shown containing client systems 110-1 to 110-N, internet 130, server system 150 and distributed database system 170. Client systems 110-1 to 110-N are collectively or individually referred by referral numeral 110, as will be clear from the context. Similar convention is used in the description related to other blocks of various Figures as well.

Merely for illustration, only representative number/type of blocks is shown in FIG. 1. Many environments often contain many more blocks, both in number and type, depending on the purpose for which the environment is designed. Specifically, many instances of server system 150 and distributed database system 170 may be present in the computing system. Each block of FIG. 1 is described below in further detail.

Internet 130 represents a data network providing connectivity between client systems 110-1 to 110-N and server system 150. Internet 130 may encompass the world-wide connected Internet. Internet 130 may be implemented using protocols such as Transmission Control Protocol (TCP) and/or Internet Protocol (IP), well known in the relevant arts. Many instances of server system 150 and distributed database 170 may be provided in a cloud infrastructure.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by internet 130. When the packet contains content such as port numbers, which specifies an internal component such as target application and/or internal system, the packet may be directed to such application or internal system as well.

Each of client systems 110-1 to 110-N represents a system such as a personal computer, workstation, mobile device, computing tablet etc., used by end users to generate (user) requests directed to the various applications executing in server system 150.

Distributed database 170 contains a collection of database servers which together store the data of interest for applications executing in server system 150. In an embodiment, each portion of data of interest corresponds to a shard noted above, and the description is accordingly continued with respect to shards in several parts below.

Server system 150 represents a server, such as a web/application server, executing one or more software applications. Each application type (e.g., ERP application, CRM Application, benefits management application, etc.) may have corresponding different application instances for purposes such as scalability and security.

Each application instance may employ corresponding execution entities to process user requests in parallel. In an embodiment, each execution entity corresponds to a thread and accordingly the description is continued with respect to threads in several parts below. As is well known, a thread is a unit of processing, which normally is provided in the context of a process. Each application instance may be executed in the form of one or more processes by the operation of processors, memory, etc.

Server system 150 receives user requests from client system 110 for an application type, and one of the application instances (of that type) may process each request by employing a corresponding thread. Server system 150 then sends the result of processing of the request to the requesting client system (one of 110) as a corresponding response to the user request.

As part of processing the request, the thread may need an end-to-end connection to distributed database 170. According to an aspect of the present disclosure, the end-to-end connection is provided using a connection pool configured to distributed database 170 as described below with examples.

4. Example Implementation

Figure 2:
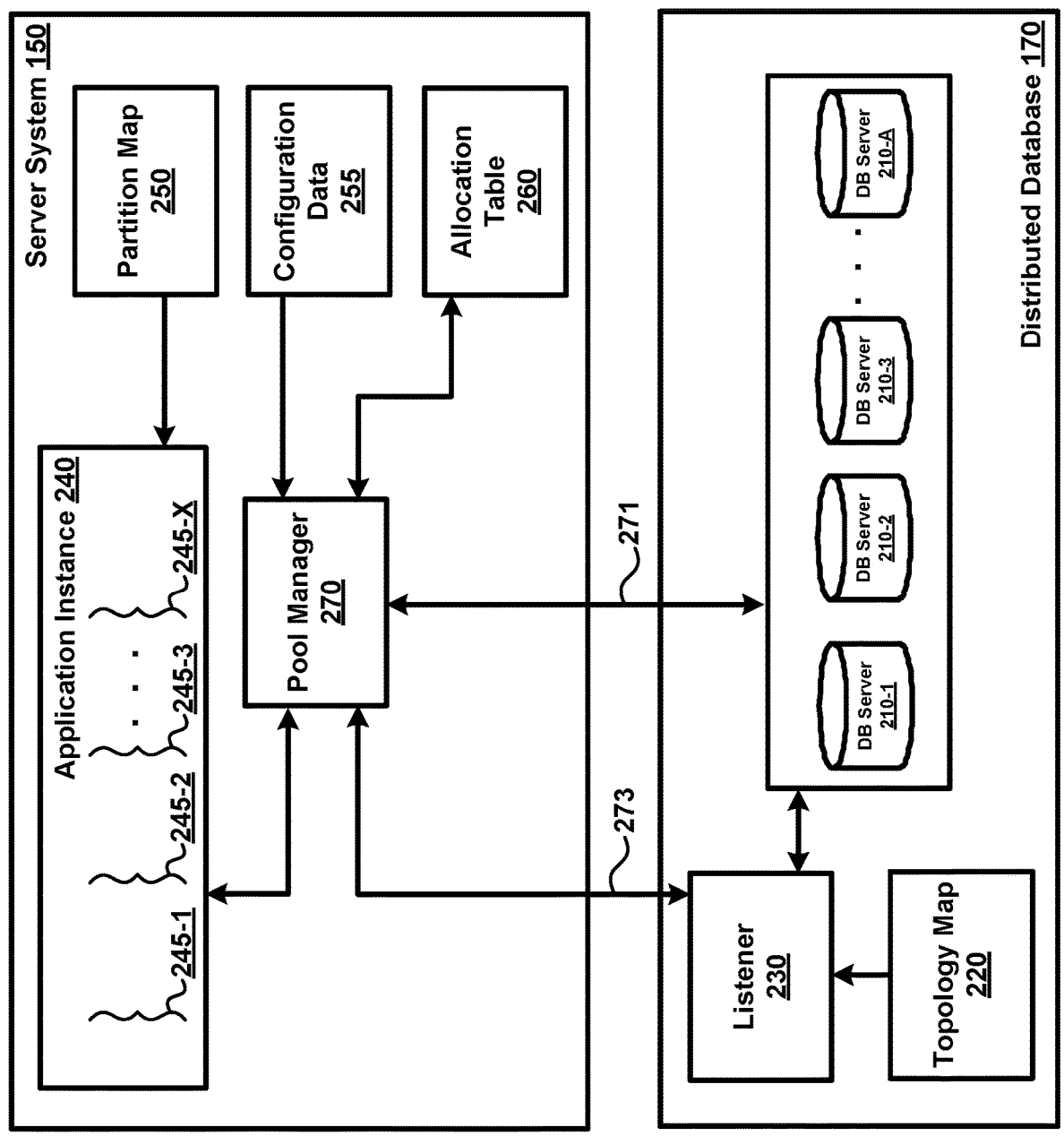
FIG. 2 is a block diagram illustrating further details of a server system and a distributed database in an embodiment.

FIG. 2 is a block diagram illustrating further details of server system 150 and distributed database 170 according to an aspect of the present disclosure. The block diagram is shown containing distributed database 170 and server system 150 connected by connection pool 271 and control path 273.

Server system 150 is shown containing application instance 240, partition map 250, configuration data 255, allocation table 260, and pool manager 270. Application instance 240 in turn is shown containing threads 245-1 through 245-X (X representing any arbitrary positive number). Distributed database 170 is shown containing database servers 210-1 to 210-A (A representing any arbitrary positive number), listener 230 and topology map 220. Each block is described below in further detail.

Connection pool 271 represents the total number of pool connections available for communication of application instance 240 to distributed database 170. As will be clear from the description, connection pool 271 is shared for all the threads of application instance 240 dynamically, implying optimization of use of the pool connections concurrently. In the description below, each established connection of the connection pool is referred to as a 'physical' connection, to distinguish from the end-to-end connections provided to threads 245. The word 'physical' also connotes the more permanent nature of that virtual connection, compared to the end-to-end connections which are setup and released more frequently based on physical connections.

As described below, pool manager 270 operates to setup end-to-end connections for various threads using physical connections of connection pool 271 according to aspects of the present disclosure. While the connection pool is described as being dedicated for the threads of application instance 240, in alternative embodiments connection pools can be shared with threads (processing entities) of other application instances (of the same application type) or with those of other application types as well.

Each of database servers 210-1 to 210-A stores one or more shards of distributed database 170. In general, each database server 210 is designed to execute a query (on the internally stored data) received on an end-to-end connection and respond with the results of execution of the query on the same connection. Topology map 220 stores data indicating the specific shards stored by each of the database servers.

Listener 230 receives (from pool manager 270) requests on path 273 indicating specific shards to which physical connections are sought to be established, and provides a response on path 273 indicating the specific database server 210 to which the corresponding physical connection can be established. Listener 230 examines the data in topology map 220 to determine a suitable database server in forming the response. In case more than one database server is found to store the shard of interest, listener 230 distributes the connections among multiple database servers for load balancing. Other performance requirements such as how soon the shard data is expected to be synchronized to the particular database server, the response times of the database server in generating responses, etc., may also be considered in forming the response.

Application instance 240 is of a particular application type, and processes some of the requests directed to such application type. Merely for conciseness, one application instance of that type is shown, though typical environments can have many application instances. Application instance 240 employs threads 245 for processing requests.

Many of the requests require access to data in distributed database 170, and at least some of threads 245 may accordingly need an end-to-end connection for processing corresponding user requests. Various blocks of server system 150 operate to provide such end-to-connections according to aspects of the present disclosure, as described below in further detail.

Partition map 250 stores data indicating the specific shard (portion of the distributed database) which would store a particular row of interest.

Threads 245 process user requests. In an embodiment, each thread is assigned to process a single user request and the thread returns to a thread pool (not shown) upon completion of processing of the request. Each thread in the thread pool is thereafter assigned the task of processing a respective next request.

While processing a request, each thread may identify the specific shard to which an end-to-end connection is required by examining partition map 250, and request pool manager 270 for such a connection. Once the end-to-end connection is communicated to be setup, each thread communicates with the corresponding shard via pool manager 270. Upon completion of processing of a request, the thread releases the end-to-end connection such that the underlying physical connection can be used for serving other threads as basis for the operation of shared connection pool.

Configuration data 255 stores the values of various parameters required for establishing pool connections of a connection pool (for respective shards) in accordance with various aspects of the present disclosure. Such established connections are hereafter referred to as 'physical connections' to merely distinguish from end-to-end connections. The parameters may include the number of pool connections of the connection pool, the name of each database server and distributed database, IP address of the database servers, port number, authentication information, and other details that are needed to establish physical connections to the database servers. It is assumed that configuration data 255 specifies a specific maximum number of pool connections that are permissible within connection pool 271.

Allocation table 260 stores the current allocation information of various pool connections in the connection pool. In an embodiment, allocation table 260 contains an entry for each of the permissible number of pool connections of a connection pool, and the allocation information indicates the connection status for each of such pool connections. The pool connection status could be one of the three values according to one convention:

Unallocated—indicates that there is no physical connection currently for that pool connection;

Busy—indicates that a physical connection is established to a database server and the physical connection is currently being used by a thread.

Available—indicates that a physical connection is established to a database server and the physical connection is currently not being used by any thread.

Thus, the busy and available statuses imply that the corresponding physical connection is established to a specific shard, which is also indicated in allocation table 260 for that entry.

Pool manager 270 transmits data (sends queries and receives responses) between application instance 240 and a corresponding database server according to the connection allocation information specified in allocation table 260. Specifically, when a query request directed to a specified shard is received from a thread, pool manager 270 determines the specific pool connection allocated to that shard for that thread, and forwards the query on the determined physical connection. Similarly, when a query response is received from a specific database server, the data in the allocation table 260 may be examined to determine the thread to which the response should be forwarded.

Pool manager 270 operates to manage (including setup and release) end-to-end connections for threads 245 based on pool connections permitted in connection pool 271. As will be clear from the description below, each end-to-end connection is constituted of a physical connection in part and a further virtual connection between the thread and pool manager 270. The operation of pool manager 270 in an embodiment according to the example convention noted above is described below in further detail.

5. Flowchart

Figure 3:
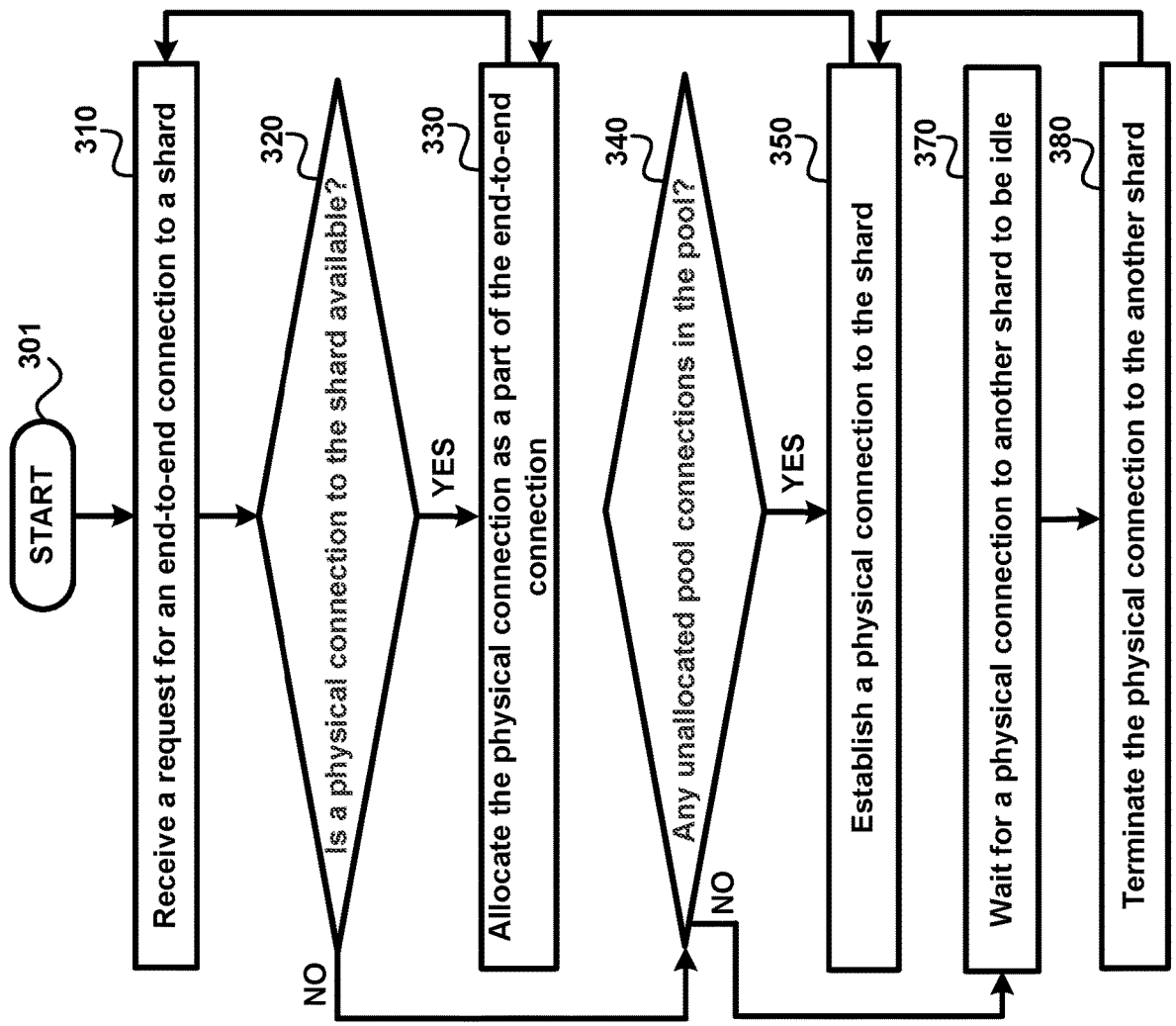
FIG. 3 is a flow chart illustrating the manner in which end-to-end connections are provided based on a connection pool according to an aspect of the present disclosure.

FIG. 3 is a flowchart illustrating the manner in which connection pools are shared by execution entities in parallel processing applications according to an aspect of the present disclosure. The flowchart is described with respect to the systems of FIG. 2 merely for illustration. However, many of the features can be implemented in other systems and/or other environments also without departing from the scope and spirit of several aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 301, in which control immediately passes to step 310.

In step 310, pool manager 270 receives a request for an end-to-end connection to a shard from thread 245. The request may be received, for example, when thread 245 requires data items from the corresponding shard (as determined based on partition map 250) or needs to write data items while processing a user request. Thus, the request may include the specified identifier of the shard (for example according to an Application program interface (API) for requesting the connection from pool manager 270) to which connection is sought.

In step 320, pool manager 270 checks if a physical connection to the requested shard is available. Such checking may entail examination of allocation table 260 to determine whether there exists a pool connection to the requested shard having status "Available" according to the example convention noted above.

In case there is already one or more physical connections established to the requested shard but the connections have 'Busy' status, pool manager 270 may wait for a pre-specified period for corresponding end-to-end connection of one of such physical connections to be released. Such physical connection would therefore be available for reallocation to another thread requiring end-to-end connection to the same shard. If a physical connection is available, control passes to step 330, and to step 340 otherwise.

In step 330, pool manager 270 allocates the physical connection to operate as part of the requested end-to-end connection. Allocation of the physical connection may entail, among other tasks, updating the corresponding entry in allocation table 260 to indicate that the physical connection can now be used by the thread. Control then passes to step 310 to process the next request.

In step 340, pool manager 270 checks whether there is any unallocated pool connection in the connection pool. Such a check may entail examining allocation table 260 to check if there is a pool connection having status "Unallocated". If there is an unallocated connection, control passes to step 350, and to step 370 otherwise.

In step 350, pool manager 270 establishes a physical connection to the requested shard based on the unallocated pool connection of the connection pool. As noted above, pool manager 270 may first communicate with listener 230 the requirement for a physical connection to the shard of interest, and receive the identity of specific database server with which physical connection is to be established on control path 273. Pool manager 270 may then send an open connection request using configuration data 255 to that particular database server storing the shard of interest. Physical connections may be established using sockets as is well known in the relevant arts. Control then passes to step 330.

In step 370, pool manager 270 waits for a physical connection to another shard to be idle. A physical connection may be determined to be idle if the connection is unused (i.e., no transmission of requests/responses) for certain duration. Once such an idle connection is found, control passes to step 380.

In step 380, pool manager 270 terminates the physical connection to the another shard. Termination may entail exchanging of appropriate signaling messages, which in turn is the basis for making ineffective the corresponding data structures at both ends of the physical connection, as will be apparent to a skilled practitioner. Control then passes to step 350, in which a physical connection is established to the requested shard, and for the thread requesting the connection.

While various steps above are described as being sequential for ease of understanding, it may be appreciated that some of the steps can be performed in parallel. For example, while waiting in step 370 for physical connections to other shards to be idle, another thread may release an end-to-end connection of a physical connection to the same requested shard in step 320, and consequently the request of step 310 may be processed in step 330 directly.

It may be further noted that pool manager 270 reallocates pool connections to different shards and makes efficient use of the limited number of physical connections within the pool. It may be appreciated that although there are no unallocated pool connections in the pool at step 340, pool manager 270 does not deny connection to the requesting thread. Instead, pool manager 270 waits for physical connections to other shards to be idle, thus dynamically providing connections to shards.

The description is continued with respect to illustrating some of the above noted features with respect to sample data.

6. Distributed Database and Shards

FIG. 4A depicts sample data in a distributed database. Specifically, database table 410 of distributed database 170 stores information about customers in an application. Database table "Customer" is shown with 15 rows [rows 411-425]. Only some of the fields of the customer table, as relevant to an understanding of the disclosure, are depicted in the Figure for conciseness. Also, the distributed database would contain many more tables and many more rows as will also be apparent to persons skilled in the art.

Column "Customer Id" specifies the unique identifier for a customer. Columns "Customer First Name" and "Customer Second Name" specify the first name and last name of the customer respectively. Column "Customer Email" specifies the email id of the customer. Column "Region" specifies the geographic region to which a customer belongs.

Figure 4B:
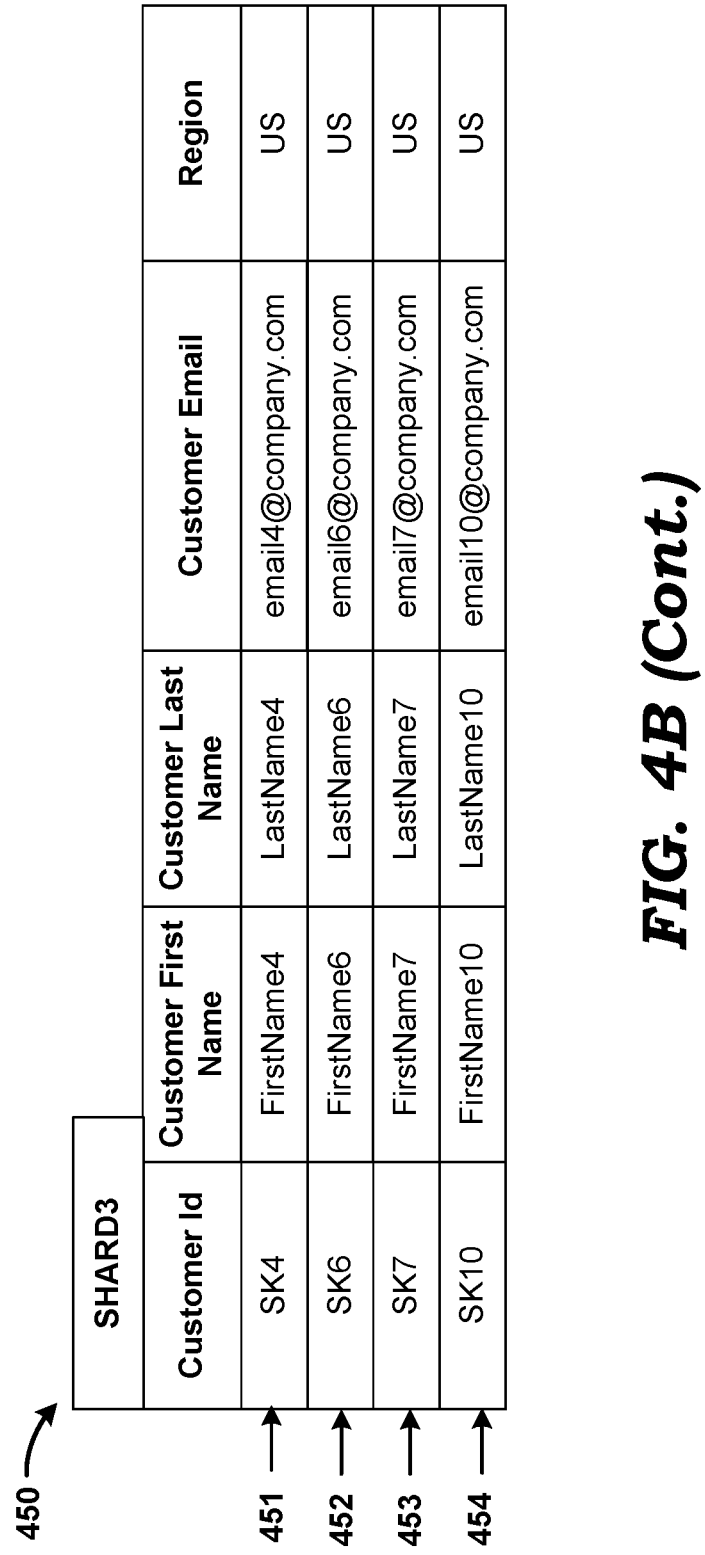
FIG. 4B depicts the manner in which sample data is partitioned into multiple shards in an embodiment.

FIG. 4B depicts the manner in which the data of interest in distributed database 170 is partitioned into multiple shards 430, 440 and 450, each containing a portion of the data (some rows). In this illustrative embodiment, sharding has been shown to be done on the basis of geographic region (column "Region") although sharding can be done on the basis of other criteria also, as is well-known in the relevant arts.

'Shard1' is shown to contain customers belonging to region Asia (rows 431-435), Shard2' (rows 441-446) is shown to contain customers belonging to region Europe and Shard3' is shown to contain customers belonging to region US (rows 451-454). In this illustrative embodiment, column "Customer Id" is the shard key. A shard key provides the partitioning key that determines in which shard a row of data is stored.

FIG. 5A depicts partition map 510 indicating the specific shard which stores a particular row of interest. Specifically, rows 511-525 depict the mapping of shard keys SK1 to SK15 (rows 411-425 of FIG. 4A) to one of the shards Shard1-Shard3. Column "Shard key" specifies the partitioning key. Column "Shard Identifier" specifies the unique identifier of a shard. Thus, rows 431-435 of table 430 are mapped to rows 511, 512 519, 521 and 525 of table 510.

FIG. 5B depicts topology map 530 indicating the specific shards stored by each of the database servers in the illustrative example. A shard may be replicated for performance and availability. In such scenarios, a shard is stored on multiple database servers. In the illustrative embodiment, shards 1 and 3 are shown as being replicated whereas shard 2 is not replicated. Column "Shard Identifier" specifies the unique identifier of a shard. Column "Database servers" specifies the list of servers on which the particular shard is stored.

Topology map 530 is accordingly shown containing three rows 531-533. Row 531 specifies that Shard1 is stored on DatabaseServer1 and DatabaseServer3. Similarly, row 533 specifies that Shard3 is stored on DatabaseServer3 and DatabaseServer2. Shard2 is stored only on one database server, namely DatabaseServer2.

FIG. 5C depicts configuration data 540 used for establishing physical connections to respective database servers. Specifically, table 540 is shown to contain three rows (541-543) with the values of various parameters for the three database servers. Column "Database Server" specifies the unique identifier for a database server. Column "IP Address" specifies the IP address of the database server.

Column "Protocol" specifies the communication protocol that should be used while establishing a physical connection to the database server. Column "Database Port Number" specifies the port number to be used as part of the connection request. Only some of the fields of the configuration table, as relevant to an understanding of the disclosure, are depicted in the Figure for conciseness. Various other columns (e.g. authentication information, etc.) can also be included in configuration data 540, as will be apparent to persons skilled in the art.

The description is continued with respect to the manner in which connection pool 271 is shared by various threads in processing user requests, in accordance with features of the present disclosure.

7. Allocation Table for Shared Connection Pools

FIGS. 6A-6E depict example states of allocation table 260 specifying the current allocation information of various pool connections in the connection pool at corresponding time instances. In the illustrative embodiment, the connection pool is configured to have a maximum of 10 connections. Merely for illustration, each pool connection of connection pool 271 is shown statically assigned to a particular row in allocation table 260 at various time instances. However, alternative approaches can be used for indicating the status of pool connections at the corresponding time instances, as will be apparent to a skilled practitioner.

Column "Connection Identifier" specifies the identifier for a pool connection. Column "Shard Identifier" specifies the shard to which the physical connection is established (if established). Column "Database Server" specifies the database server to which the physical connection is established. Column "Thread Id" specifies the thread which is using the physical connection to transmit data between application instance and database server. Column "Connection Status" specifies the current status of the pool connection. The example convention described above is used for the connection status. Column "Last Used" specifies a timestamp when the pool connection was last used by a thread.

All pool connections, and thus 'Connection Status' field in each row, are initially have "Unallocated" status. When a thread is allocated the pool connection, pool manager 270 changes the status from "Unallocated" to "Busy". When a thread releases (an end-to-end connection of) a pool connection, pool manager 270 changes the status of the pool connection from "Busy" to "Available". If a pool connection has "Available" status beyond certain duration (as measured from 'Last Used' field of the same row), pool manager 270 may terminate the physical connection to the corresponding database server and change the pool connection status from "Available" to "Unallocated".

The description is continued with respect to the manner in which the state of FIG. 6A is obtained. Broadly, server system 150 receives a user request from client system 110 for an application type. Application instance 240 processes the request by employing Thread3 to serve the request. As part of processing the request, Thread3 needs access to customer information in row 433 of table 430 in FIG. 4B. Thread3 looks up the partition map 510 and identifies that the required information is in Shard1 (row 519 of table 510 in FIG. 5A) and hence Thread3 needs an end-to-end connection to Shard1.

Pool manager 270 (step 310) receives a request for an end-to-end connection to Shard1 from Thread3 and checks (step 320) if a physical connection to the requested shard is available. Specifically, pool manager 270 examines allocation table 260 and determines that there are no pool connections to Shard1 having "Available" status. Therefore, pool manager 270 proceeds to step 340 and checks if there is any pool connection having "Unallocated" status. Pool manager 270 examines allocation table 600 and determines that there are 10 pool connections having "Unallocated" status.

Pool manager 270 then proceeds to step 350 where pool manager 270 sends a communication to listener 230 on control path 273 indicating that a physical connection to Shard1 needs to be established. Listener 230 examines topology map 530 of FIG. 5A and determines that Shard1 is stored on database servers DBServer1 and DBServer3. Listener 230 selects DBServer1 as there are no physical connections to both the database servers. Listener 230 provides a response to pool manager 270 indicating to connect to DBServer1. Pool manager 270 examines configuration data in row 541 of table 540.

Pool manager 270 establishes the physical connection to DBServer1 by appropriate exchange of data packets. Pool manager 270 then completes allocation of the pool connection to Thread3 by updating connection entry in row 601. Specifically, pool manager 270 updates column "Shard Identifier" to Shard1, column "Database Server" to DBServer1, column "Thread Id" to Thread3 and column "Connection Status" to "Busy".

Once row 601 is thus setup, pool manager 270 uses the physical connection in row 601 thereafter to transmit data between Thread3 and Shard1. Specifically, when a query is sought to be transmitted by Thread3 to Shard 1, pool manager 270 examines allocation table 260/600 to determine that the query is to be transmitted on connection 1 of row 601. When the response is received on the physical connection, the same row is examined to forward the response to Thread3.

In this manner, various threads requesting end-to-end connections to different shards are allocated pool connections by the operation of pool manager 270 and listener 230. The formation and usage of rows 601-606 is similarly described. The allocation table thus reaches the state as indicated in FIG. 6A.

After the state of FIG. 6A, it is assumed that Thread6 requests an end-to-end connection to Shard1. In step 320, pool manager 270 looks up allocation table 600 and determines that there are three pool connections to Shard1 (rows 601, 604, 606) but all are having "Busy" status, being used by Thread3, Thread1 and Thread9 respectively. Therefore, pool manager 270 proceeds to step 340 and determines that there are pool connections having "Unallocated" status (rows 607-610).

Pool manager 270 therefore communicates the requirement for a physical connection to Shard1 to listener 230. Listener 230 looks up topology map 530 of FIG. 5A and determines that Shard1 is stored on database servers DBServer1 and DBServer3. Listener 230 selects DBServer3 as there are already two physical connections to DBServer1 and only one connection to DBServer3. In this manner, Listener 230 may route connections to database servers and perform run-time load balancing. Listener 230 sends the response to pool manager 270 indicating to connect to DBServer3. As described above, Thread6 is allocated connection 7 of FIG. 6A. Though not shown, row 607 of FIG. 6A is updated with values "Shard1", "DBServer3", "Thread6" and "Busy" status in the respective columns.

FIG. 6B depicts the state of allocation table at a second time instance. It may be observed that there are no pool connections having "Unallocated" status. There are three pool connections to Shard1 (rows 611, 614 and 615), with two pool connections having connection status "Busy" (rows 611, 615) and one "Available" (row 614).

Pool manager 270 is now assumed to receive a request from Thread17 for an end-to-end connection to Shard1. Pool manager 270 examines allocation table 600 in step 320 and determines that there is one pool connection to Shard1 which has "Available" status (row 614). Therefore, pool manager 270 proceeds to step 330 and allocates connection 4 to Thread17 and updates row 614 with the corresponding thread id and connection status.

Another thread, Thread19, is assumed to request an end-to-end connection to Shard2, and pool manager 270 determines that there are three pool connections to Shard2 (rows 612, 619 and 620), but all have connection status "Busy". Pool manager 270 proceeds to step 340 and finds that there are no "Unallocated" pool connections. Therefore, pool manager 270 checks if reallocation of pool connection is possible in step 370. In step 370, pool manager 270 determines that there are four pool connections to Shard3, out of which only one has connection status "Busy" (row 617) and the rest are "Available" (rows 613, 616 and 618).

Also, pool manager 270 determines that pool connection 6 (row 616) is idle based on the "Last Used" timestamp of connection 6. Therefore, pool manager 270 selects connection 6 to reallocate from Shard3 to Shard2. Pool manager 270, in step 380, terminates physical connection to Shard3. Pool manager 270 then proceeds to step 350. As described above, pool manager 270 establishes physical connection to DBServer2 and allocates the same to Thread19. The corresponding state of allocation table 260 at a third time instance (following the state of FIG. 6B) is depicted in FIG. 6C (rows 624 and 626 have the updated values).

8. Operation When Waiting for a Pool Connection

As noted above, requests that reach processing at step 370 of FIG. 2 (i.e., when no physical connection is present to the requested shard at step 320 and there are no unallocated pool connections in step 340) are required to wait for physical connections to another shard to be idle. Similarly, threads may also wait for physical connections to the same shard to be available in step 320. The combined wait operations are implemented as described below in one embodiment.

FIG. 6D depicts the state of allocation table 600 at a fourth time instance. All the 10 pool connections of connection pool 271 are shown having "Busy" status. In an embodiment, when additional requests are received in such a state, a wait-and-signal mechanism is used as described with respect to FIGS. 7A-7F.

Figure 7A:
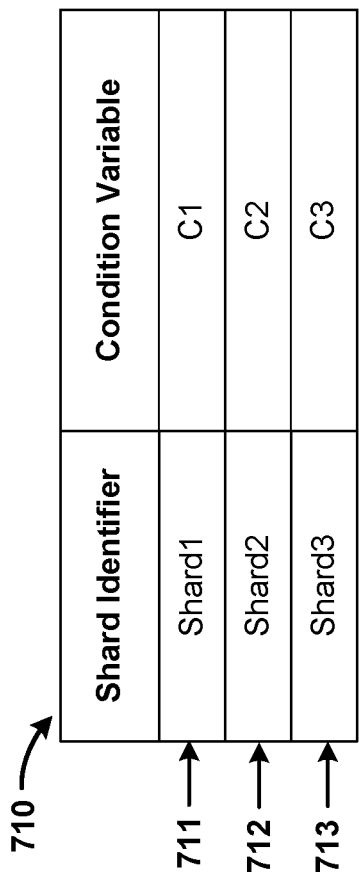
FIG. 7A is a table indicating the condition variables used for signaling threads waiting for end-to-end connections to respective shards.

FIG. 7A depicts a table for specifying condition variables for respective shard identifiers. The table is shown containing three rows (711-713) for the three shards in the illustrative embodiment. In an embodiment, table 710 may be a hash-table with the shard identifier as the key and the corresponding condition variable as the value.

Thus, when all pool connections are busy, a conditional wait operation is executed on the variable corresponding to the shard of interest. Execution of the operation causes the thread to be placed in a wait queue (shown in FIG. 7C) and the operation of the thread to be suspended.

When physical connection becomes available for that shard, a 'signal' operation is executed on the queue corresponding to the shard, which causes one of the waiting threads to be woken up (to continue execution). In case multiple threads are in the queue (as depicted in Shard2 Queue of FIG. 7E), the earliest/first one in the queue is woken up according to one convention. In an embodiment, the signal operation is executed by each thread as a part of releasing the end-to-end connection.

Figure 7B:
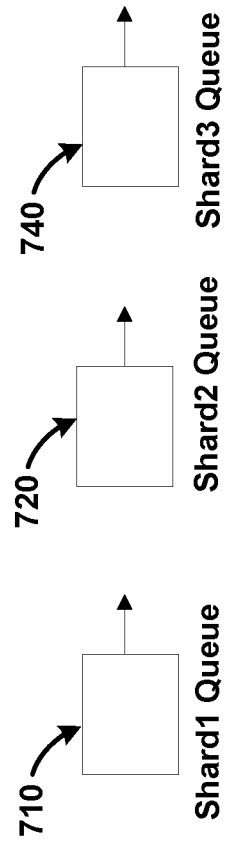
FIGS. 7B-7F depict example states of wait queues of the respective threads waiting for each of the shards.
Figure 7C:
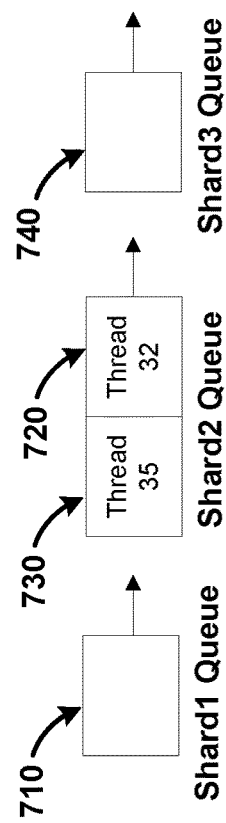
Figure 7E:
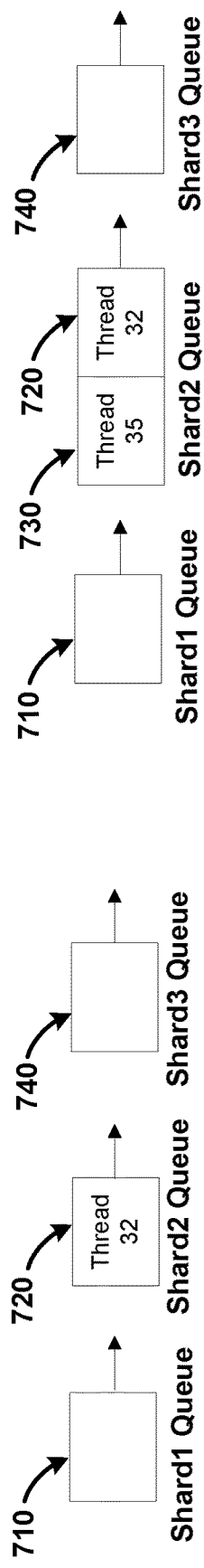
Figure 7D:
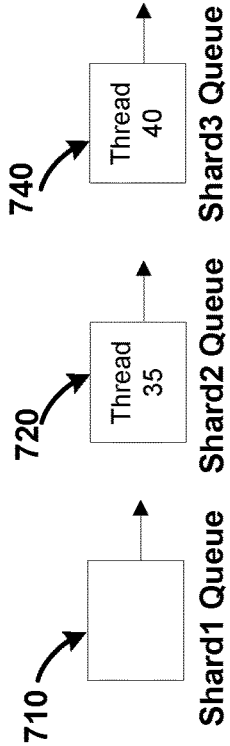

FIG. 7B depicts the state of queues for respective shards at the time instance corresponding to the state at which FIG. 6D is obtained. There are no threads shown waiting for any of the shards.

Now it is assumed that pool manager 270 receives a request from Thread32 for an end-to-end connection to Shard2. By executing steps 320-370 of the flowchart, pool manager 270 determines that Thread32 has to wait for a pool connection to Shard2.

Before waiting, Thread32 looks up condition variable hash-table in the connection pool. Thread32 retrieves the condition variable associated with Shard2 from the hash-table (row 712) and then waits on the condition variable. As part of waiting, Thread32 gets added to the wait queue as depicted in 720 in FIG. 7C.

It is assumed that Thread35 also requests an end-to-end connection to Shard2. As described above, Thread35 also gets added to the queue of threads waiting for Shard2 (730 in FIG. 7D).

Now, it is assumed that Thread40 requests an end-to-end connection to Shard3. As described above, Thread40 gets added to the queue of threads waiting for Shard3 (740 in FIG. 7E).

After a while, Thread28 releases (the end-to-end connection on) connection 2 to Shard1 (row 632 of FIG. 6D). At the time of releasing the pool connection, Thread28 looks up the condition variable hash-table and retrieves the condition variable for the corresponding shard (row 711). Thread28 signals a thread waiting on the condition variable. Since there are no threads waiting for connection to Shard1, the signal has no effect.

It may be appreciated that when Thread28 signals waiting threads while releasing connection 2, Thread32 is not signaled as Thread32 is waiting for connection to Shard2 whereas Thread28 has released connection to Shard1. Thus CPU usage is optimized as only one of targeted subset of threads is woken up each time a connection is released to the connection pool.

Figure 7F:
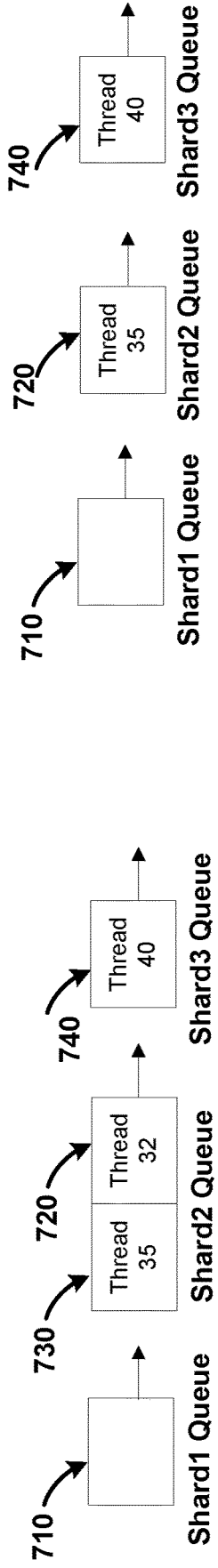

After a while, Thread20 releases (end-to-end connection on) connection 4 to Shard2 (row 634 of FIG. 6D). At the time of releasing the connection, Thread20 looks up the condition variable hash-table and retrieves the condition variable for the corresponding shard (row 712). Thread20 signals a thread waiting on the condition variable. Thread32 and Thread35, as described above, are waiting on the same condition variable. Therefore, when Thread20 signals a waiting thread, Thread32 (since it is first in the queue) wakes up and is allocated connection 4 as depicted in row 644 of FIG. 6E. Thread32 is removed from Shard2 queue as depicted in FIG. 7F. Thread35 is now in first position in Shard2 queue.

In another embodiment, when a thread releases a pool connection to a particular shard and retrieves condition variable associated with the corresponding shard, the thread can signal multiple threads waiting on the condition variable by doing a "broadcast" signal.

In an alternative scenario, when certain pre-specified time duration has elapsed after Thread28 releases connection 2 to Shard1 and no other threads have released pool connections to Shard2 during that time, pool manager 270 determines the pool connection to be idle and reallocates the same to waiting Thread32. The reallocation is done in the manner described above.

In this manner, a single connection pool is shared by multiple execution entities in an application instance accessing distributed database. While the description is provided with respect to sharing of the connection pool by a single application instance, alternative embodiments can be implemented (within the scope of several aspects of the present invention) to have the connection pool shared by multiple application instances of the same application type, as will be apparent to a skilled practitioner based on the disclosure provided herein. Similarly, in further alternative embodiments, a connection pool may be shared by execution entities across application instances of different application types, as will also be apparent to a skilled practitioner.

It should be appreciated that the features described above can be implemented in various embodiments as a desired combination of one or more of hardware, software, and firmware. The description is continued with respect to an embodiment in which various features are operative when the software instructions described above are executed.

9. Digital Processing System

Figure 8:
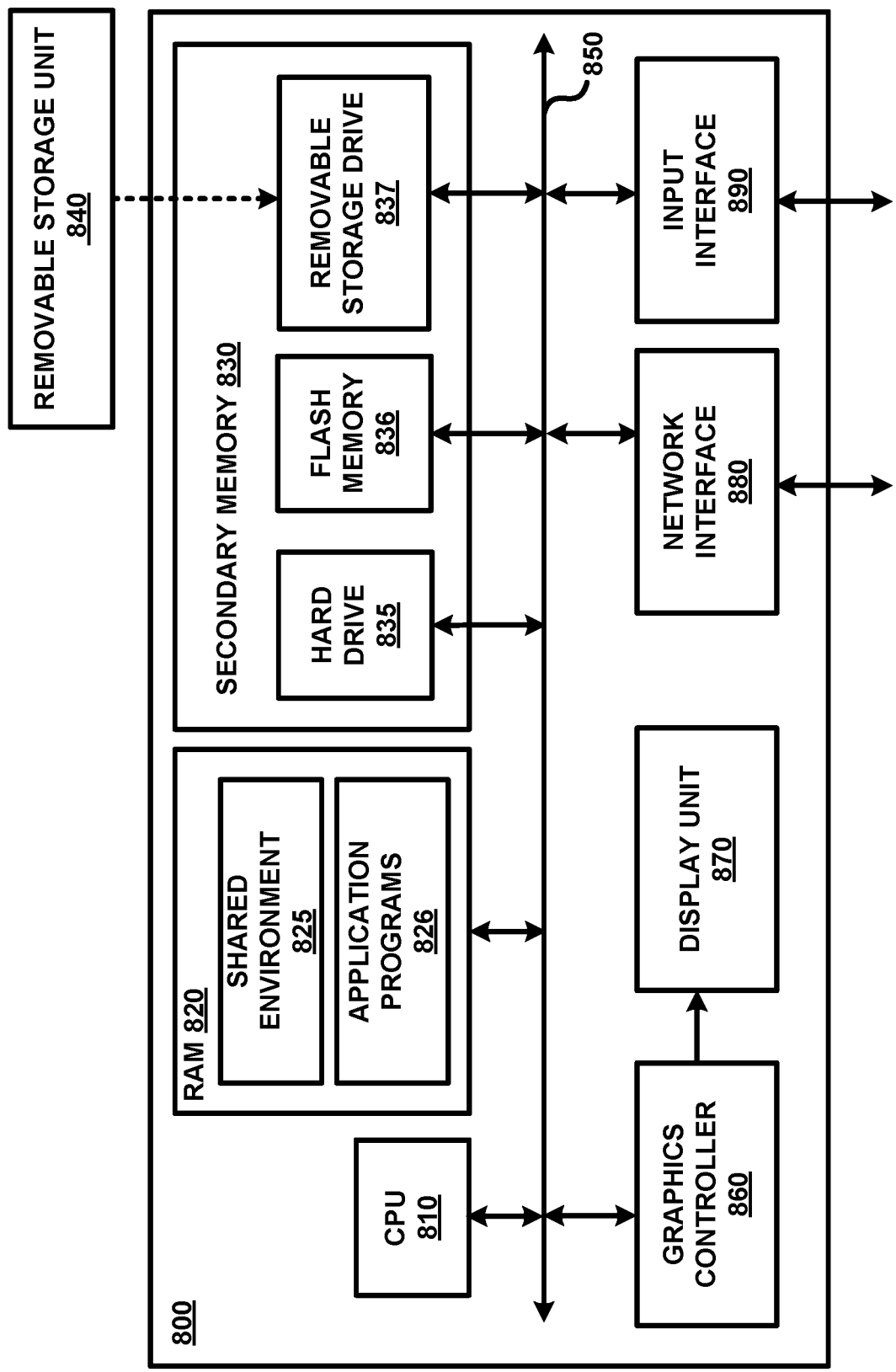
FIG. 8 is a block diagram illustrating the details of a digital processing system in which various aspects of the present disclosure are operative by execution of appropriate executable modules.

FIG. 8 is a block diagram illustrating the details of digital processing system 800 in which various aspects of the present disclosure are operative by execution of appropriate executable modules. Digital processing system 800 may correspond to one of client system 110 or server system 150.

Digital processing system 800 may contain one or more processors such as a central processing unit (CPU) 810, random access memory (RAM) 820, secondary memory 830, graphics controller 860, display unit 870, network interface 880, and input interface 890. All the components except display unit 870 may communicate with each other over communication path 850, which may contain several buses as is well known in the relevant arts. The components of FIG. 8 are described below in further detail.

CPU 810 may execute instructions stored in RAM 820 to provide several features of the present disclosure. CPU 810 may contain multiple processing units, with each processing unit potentially being designed for a specific task. Alternatively, CPU 810 may contain only a single general-purpose processing unit.

RAM 820 may receive instructions from secondary memory 830 using communication path 850. RAM 820 is shown currently containing software instructions constituting shared environment 825 and/or other user programs 826 (such as other applications, DBMS, etc.). Shared environment 825 contains software programs such as device drivers, operating systems, virtual machines, containers, etc., which provide a (shared) run time environment for execution of other/user programs. A combination of such software programs, as applicable in the pertinent computing environment, for execution of programs including those specifically implementing the features noted above, may be referred to as system utilities. Thus system utilities provide a framework for execution of application instance 240 (including threads 245) and pool manager 270.

Graphics controller 860 generates display signals (e.g., in RGB format) to display unit 870 based on data/instructions received from CPU 810. Display unit 870 contains a display screen to display the images defined by the display signals. Input interface 890 may correspond to a keyboard and a pointing device (e.g., touch-pad, mouse) and may be used to provide inputs. Network interface 880 provides connectivity to a network (e.g., using Internet Protocol), and may be used to communicate with distributed database 170 (of FIG. 1) connected to the networks (130).

Secondary memory 830 may contain hard drive 835, flash memory 836, and removable storage drive 837. Secondary memory 830 may store the data (for example, data portions shown in FIGS. 5A-5C) and software instructions (for example, for implementing the various features of the present disclosure as shown in FIG. 2, etc.), which enable digital processing system 800 to provide several features in accordance with the present disclosure. The code/instructions stored in secondary memory 830 may either be copied to RAM 820 prior to execution by CPU 810 for higher execution speeds, or may be directly executed by CPU 810.

Some or all of the data and instructions may be provided on removable storage unit 840, and the data and instructions may be read and provided by removable storage drive 837 to CPU 810. Removable storage unit 840 may be implemented using medium and storage format compatible with removable storage drive 837 such that removable storage drive 837 can read the data and instructions. Thus, removable storage unit 840 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 840 or hard disk installed in hard drive 835. These computer program products are means for providing software to digital processing system 800. CPU 810 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 830. Volatile media includes dynamic memory, such as RAM 820. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 850. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

10. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method implemented in a server system for supporting end-to-end-connections from execution entities to a plurality of database instances based on a fixed number of a plurality of pool connections from said server system as a shared connection pool, each end-to-end connection containing a virtual connection from an execution entity to said server system and a physical connection of a plurality of physical connections from said server system to one of said plurality of database instances provided based on a corresponding pool connection, wherein each physical connection is established for communication at any time instance with only a single database instance of said plurality of database instances together implementing a distributed database, said method comprising:

maintaining a plurality of wait queues for said plurality of database instances, wherein each wait queue of said plurality of wait queues is used for queueing execution entities waiting for respective end-to-end connections to be allocated to a corresponding database instance of said plurality of database instances;

receiving a first request from a first execution entity for a first end-to-end connection to a first database instance;

allocating said first end-to-end connection based on a first virtual connection and a first physical connection of said plurality of physical connections, wherein said first execution entity sends database queries directed to said distributed database on said first virtual connection of said first end-to-end connection;

receiving a second request, at a second time instance, from a second execution entity for a second end-to-end connection to a second database instance, wherein said first end-to-end connection is continued to be allocated to said first execution entity at said second time instance;

if, at said second time instance, none of said plurality of physical connections is available for allocating said second end-to-end connection to said second database instance:

queueing said second execution entity in a second wait queue of said plurality of wait queues at a third time instance following said second time instance, said second wait queue being associated with said second database instance, wherein presence of said second execution entity in said second wait queue indicates that said second end-to-end connection is not yet allocated to said second execution entity and said second execution entity is seeking to establish connection with said second database instance;

upon said first execution entity releasing said first end-to-end connection after said third time instance, checking whether there are execution entities waiting in a first wait queue of said plurality of wait queues associated with said first database instance, wherein said first end-to-end connection is released after said first execution entity receives responses to said database queries;

if there are execution entities waiting in said first wait queue, allocating an additional end-to-end connection based on said first physical connection to one of said execution entities waiting in said first wait queue to enable said one of said execution entities to continue processing the corresponding request to said first database instance; and if there are no execution entities waiting in said first wait queue, terminating said first physical connection to said first database instance and then allocating said second end-to-end connection based on said first physical connection to said second database instance and removing said second execution entity from said second wait queue.

2. The method of claim 1, wherein said plurality of database instances comprise a plurality of shards together constituting said distributed database, wherein each of said execution entities is a corresponding thread of a plurality of threads employed by an application instance for processing requests including said first request and said second request, wherein said first database instance comprises a first shard of said plurality of shards, and wherein said first execution entity and said second execution entity respectively comprises a first thread and a second thread of said plurality of threads.

3. The method of claim 2, wherein each physical connection can be used by only a single thread at any time durations, wherein threads waiting for each shard are placed in a suspended wait state in the corresponding wait queue, wherein allocating said additional end-to-end connection comprises, upon a physical connection becoming available for a shard, waking up a thread in only the wait queue for that shard such that the woken up thread can continue execution.

4. The method of claim 3, wherein said first request is received at a first time instance, said method further comprising:

maintaining an allocation table indicating a status of each pool connection of said shared connection pool, wherein said status indicates whether or not a corresponding physical connection is established on the pool connection, if a physical connection is established on the pool connection, the shard to which the physical connection is established and whether the physical connection is currently available or busy, if the physical connection is indicated to be busy, a specific thread for which a corresponding end-to-end connection is currently provided based on the physical connection, wherein threads requesting new end-to-end connections are placed in said wait queues if said allocation table indicates that all pool connections are busy.

5. The method of claim 4, wherein at said first time instance a first entry of said allocation table indicates that said first physical connection established to said first shard is currently available, said method further comprising:

changing said first entry to indicate that said first physical connection is provided as a part of end-to-end connection for said first thread, and said status to indicate that said first physical connection is thereafter busy.

6. The method of claim 4, wherein at said first time instance no physical connections are established on a subset of pool connections of said plurality of pool connections, said method further comprising:

establishing a second physical connection to said first shard based on a second pool connection of said subset of pool connections;

changing an entry corresponding to said second pool connection to indicate that said second physical connection is established to said first shard as a part end-to-end connection for said first thread, and said status to indicate that said second physical connection is thereafter busy.

7. The method of claim 4, wherein at said first time instance all of said plurality of pool connections are indicated to be allocated to respective physical connections, said method further comprising:

waiting for a third physical connection to a second shard to become idle, wherein a physical connection is deemed to be idle upon not being used by any thread for a pre-specified duration;

terminating said third physical connection to said second shard;

establishing said third physical connection to said first shard based on a third pool connection on which said third physical connection was previously established; and changing an entry corresponding to said third pool connection to indicate that said third physical connection is established to said first shard as a part end-to-end connection for said first thread, and said status to indicate that said third physical connection is thereafter busy.

8. A non-transitory machine readable medium storing one or more sequences of instructions for causing a server system to provide a shared connection pool, wherein execution of said one or more instructions by one or more processors contained in said server system causes performance of the actions of:

maintaining a plurality of physical connections, with each physical connection being a corresponding pool connection of a shared connection pool, wherein each physical connection is established for communication at any time instance with only a single database instance of a plurality of database instances together implementing a distributed database;

maintaining a plurality of wait queues for said plurality of database instances, wherein each wait queue of said plurality of wait queues is used for queueing execution entities waiting for a corresponding database instance of said plurality of database instances;

maintaining an allocation table indicating whether or not a corresponding physical connection is established to a respective database instance of the plurality of database instances, and an association of the corresponding physical connection to the respective database instance;

receiving a first request from a first execution entity for a first end-to-end connection to a first database instance, wherein each end-to-end connection comprises one of said plurality of physical connections and a corresponding virtual connection from the requesting execution entity;

allocating said first end-to-end connection based on a first virtual connection and a first physical connection of said plurality of physical connections, wherein said first execution entity sends database queries directed to said distributed database on said first virtual connection of said first end-to-end connection;

receiving a second request, at a second time instance, from a second execution entity for a second end-to-end connection to a second database instance, wherein said first end-to-end connection is continued to be allocated to said first execution entity at said second time instance;

if, at said second time instance, said allocation table indicates that none of said plurality of physical connections is available for processing said second request to said second database instance:
queueing said second execution entity in a second wait queue of said plurality of wait queues at a third time instance following said second time instance, said second wait queue being associated with said second database instance, wherein presence of said second execution entity in said second wait queue indicates that said second end-to-end connection is not yet allocated to said second execution entity and said second execution entity is seeking to establish connection with said second database instance;
upon said first execution entity releasing said first end-to-end connection after said third time instance, checking whether there are execution entities waiting in a first wait queue of said plurality of wait queues associated with said first database instance, wherein said first end-to-end connection is released after said first execution entity receives responses to said database queries;
if there are execution entities waiting in said first wait queue, allocating an additional end-to-end connection based on said first physical connection to one of said execution entities waiting in said first wait queue to enable said one of said execution entities to continue processing the corresponding request; and
if there are no execution entities waiting in said first wait queue, terminating said first physical connection to said first database instance, allocating said second end-to-end connection based on said first physical connection to said second database instance, and updating said allocation table to indicate that said first physical connection is now established to said second database instance.

9. The non-transitory machine readable medium of claim 8, wherein said plurality of database instances comprise a plurality of shards together constituting said distributed database, wherein each of said execution entities is a corresponding thread of a plurality of threads employed by an application instance for processing requests including said first request and said second request, wherein said first database instance comprises a first shard of said plurality of shards, and wherein said first execution entity and said second execution entity respectively comprises a first thread and a second thread of said plurality of threads.

10. The non-transitory machine readable medium of claim 9, wherein each physical connection can be used by only a single thread at any time durations,
wherein threads waiting for each shard are placed in a suspended wait state in the corresponding wait queue,
wherein allocating said additional end-to-end connection comprises, upon a physical connection becoming available for a shard, waking up a thread in only the wait queue for that shard such that the woken up thread can continue execution.

11. The non-transitory machine readable medium of claim 10, wherein said first request is received at a first time instance, wherein said allocation table further indicating a status of each pool connection of said shared connection pool, including:
if a physical connection is established on the pool connection, the shard to which the physical connection is established and whether the physical connection is currently available or busy,
if the physical connection is indicated to be busy, a specific thread for which a corresponding end-to-end connection is currently provided based on the physical connection,
wherein threads requesting new end-to-end connections are placed in said wait queues if said allocation table indicates that all pool connections are busy.

12. The non-transitory machine readable medium of claim 11, wherein at said first time instance a first entry of said allocation table indicates that said first physical connection established to said first shard is currently available, said actions further comprising:
changing said first entry to indicate that said first physical connection is provided as a part of end-to-end connection for said first thread, and said status to indicate that said first physical connection is thereafter busy.

13. The non-transitory machine readable medium of claim 11, wherein at said first time instance no physical connections are established on a subset of pool connections of said plurality of pool connections, said actions further comprising:
establishing a second physical connection to said first shard based on a second pool connection of said subset of pool connections; and
changing an entry corresponding to said second pool connection to indicate that said second physical connection is established to said first shard as a part end-to-end connection for said first thread, and said status to indicate that said second physical connection is thereafter busy.

14. The non-transitory machine readable medium of claim 11, wherein at said first time instance all of said plurality of pool connections are indicated to be allocated to respective physical connections, said actions further comprising:
waiting for a third physical connection to a second shard to become idle, wherein a physical connection is deemed to be idle upon not being used by any thread for a pre-specified duration;
terminating said third physical connection to said second shard;
establishing said third physical connection to said first shard based on a third pool connection on which said third physical connection was previously established; and
changing an entry corresponding to said third pool connection to indicate that said third physical connection is established to said first shard as a part end-to-end connection for said first thread, and said status to indicate that said third physical connection is thereafter busy.

15. A server system for supporting end-to-end-connections from execution entities to a plurality of database instances based on a fixed number of a plurality of pool connections from said server system as a shared connection pool, each end-to-end connection containing a virtual connection from an execution entity to said server system and a physical connection of a plurality of physical connections from said server system to one of said plurality of database instances provided based on a corresponding pool connection, wherein each physical connection is established for communication at any time instance with only a single database instance of said plurality of database instances together implementing a distributed database, said system comprising:
one or more memories for storing instructions; and one or more processors, wherein execution of the instructions by the one or more processors causes the server system to perform the actions of:

maintaining a plurality of wait queues for said plurality of database instances, wherein each wait queue of said plurality of wait queues is used for queueing execution entities waiting for respective end-to-end connections to be allocated to a corresponding database instance of said plurality of database instances;

receiving a first request from a first execution entity for a first end-to-end connection to a first database instance;

allocating said first end-to-end connection based on a first virtual connection and a first physical connection of said plurality of physical connections, wherein said first execution entity sends database queries directed to said distributed database on said first virtual connection of said first end-to-end connection;

receiving a second request, at a second time instance, from a second execution entity for a second end-to-end connection to a second database instance, wherein said first end-to-end connection is continued to be allocated to said first execution entity at said second time instance;

if, at said second time instance, none of said plurality of physical connections is available for allocating said second end-to-end connection to said second database instance:

queueing said second execution entity in a second wait queue of said plurality of wait queues at a third time instance following said second time instance, said second wait queue being associated with said second database instance, wherein presence of said second execution entity in said second wait queue indicates that said second end-to-end connection is not yet allocated to said second execution entity and said second execution entity is seeking to establish connection with said second database instance;

upon said first execution entity releasing said first end-to-end connection after said third time instance, checking whether there are execution entities waiting in a first wait queue of said plurality of wait queues associated with said first database instance, wherein said first end-to-end connection is released after said first execution entity receives responses to said database queries;

if there are execution entities waiting in said first wait queue, allocating an additional end-to-end connection based on said first physical connection to one of said execution entities waiting in said first wait queue to enable said one of said execution entities to continue processing the corresponding request to said first database instance; and if there are no execution entities waiting in said first wait queue, terminating said first physical connection to said first database instance and then allocating said second end-to-end connection based on said first physical connection to said second database instance and removing said second execution entity from said second wait queue.

16. The server system of claim 15, wherein said plurality of database instances comprise a plurality of shards together constituting said distributed database, wherein each of said execution entities is a corresponding thread of a plurality of threads employed by an application instance for processing requests including said first request and said second request, wherein said first database instance comprises a first shard of said plurality of shards, and wherein said first execution entity and said second execution entity respectively comprises a first thread and a second thread of said plurality of threads.

17. The server system of claim 16, wherein each physical connection can be used by only a single thread at any time durations, wherein threads waiting for each shard are placed in a suspended wait state in the corresponding wait queue, wherein allocating said additional end-to-end connection comprises, upon a physical connection becoming available for a shard, waking up a thread in only the wait queue for that shard such that the woken up thread can continue execution.

18. The server system of claim 17, wherein said first request is received at a first time instance, said actions further comprising:

maintaining an allocation table indicating a status of each pool connection of said shared connection pool, wherein said status indicates whether or not a corresponding physical connection is established on the pool connection, if a physical connection is established on the pool connection, the shard to which the physical connection is established and whether the physical connection is currently available or busy, if the physical connection is indicated to be busy, a specific thread for which a corresponding end-to-end connection is currently provided based on the physical connection, wherein threads requesting new end-to-end connections are placed in said wait queues if said allocation table indicates that all pool connections are busy.

19. The server system of claim 18, wherein at said first time instance a first entry of said allocation table indicates that said first physical connection established to said first shard is currently available, said actions further comprising:

changing said first entry to indicate that said first physical connection is provided as a part of end-to-end connection for said first thread, and said status to indicate that said first physical connection is thereafter busy.

20. The server system of claim 18, wherein at said first time instance no physical connections are established on a subset of pool connections of said plurality of pool connections, said actions further comprising:

establishing a second physical connection to said first shard based on a second pool connection of said subset of pool connections;

changing an entry corresponding to said second pool connection to indicate that said second physical connection is established to said first shard as a part end-to-end connection for said first thread, and said status to indicate that said second physical connection is thereafter busy.

* * * * *